(12) United States Patent
Meyer

(10) Patent No.: US 6,353,297 B1
(45) Date of Patent: Mar. 5, 2002

(54) SERIES MOTOR

(75) Inventor: Christoph Meyer, Stuttgart (DE)

(73) Assignee: C. & E. Fein GmbH & Co. (DE)

( * ) Notice: Subject to any disclaimer, the term of this patent is extended or adjusted under 35 U.S.C. 154(b) by 0 days.

(21) Appl. No.: 09/470,391

(22) Filed: Dec. 22, 1999

(30) Foreign Application Priority Data

Dec. 24, 1998 (DE) .......................... 198 60 262
Mar. 18, 1999 (DE) .......................... 199 12 121

(51) Int. Cl.$^7$ ................................................ H02P 3/00
(52) U.S. Cl. ...................... 318/273; 318/244; 318/245; 318/246; 318/261; 318/381
(58) Field of Search ................. 318/244–252, 318/379–381, 261, 264, 254, 273, 375, 378

(56) References Cited

U.S. PATENT DOCUMENTS

| 2,818,542 A | 12/1957 | Lindsley et al. ............ 318/377 |
| 4,144,482 A | 3/1979 | Schwab ...................... 318/388 |

FOREIGN PATENT DOCUMENTS

| AT | 210 967 | 9/1960 |
| DE | 26 52 521 | 5/1978 |
| DE | 27 38 249 | 3/1979 |
| DE | 36 36 555 A1 | 5/1988 |
| DE | 43 33 733 A1 | 4/1995 |
| DE | 195 42 603 A1 | 5/1996 |
| WO | WO 91/03866 | 3/1991 |
| WO | WO 97/36367 | 10/1997 |

*Primary Examiner*—Robert E. Nappi
*Assistant Examiner*—Rita Leykin
(74) *Attorney, Agent, or Firm*—St. Onge Steward Johnston & Reens LLC

(57) ABSTRACT

A series motor with commutator is disclosed which is especially suited as universal motor for a braked power tool. The series motor comprises a switch for switching between a motor mode and a braking mode, wherein, in motor mode, at least one field winding is connected in series with an armature winding in a motor circuit, which is connected to an a.c. power source, and wherein, in braking mode, the at least one field winding and the armature winding form together a closed braking circuit disconnected from the power source. The secondary winding of a mains-operated transformer is connected within the braking circuit. This arrangement guarantees improved safety of the braking action.

21 Claims, 3 Drawing Sheets

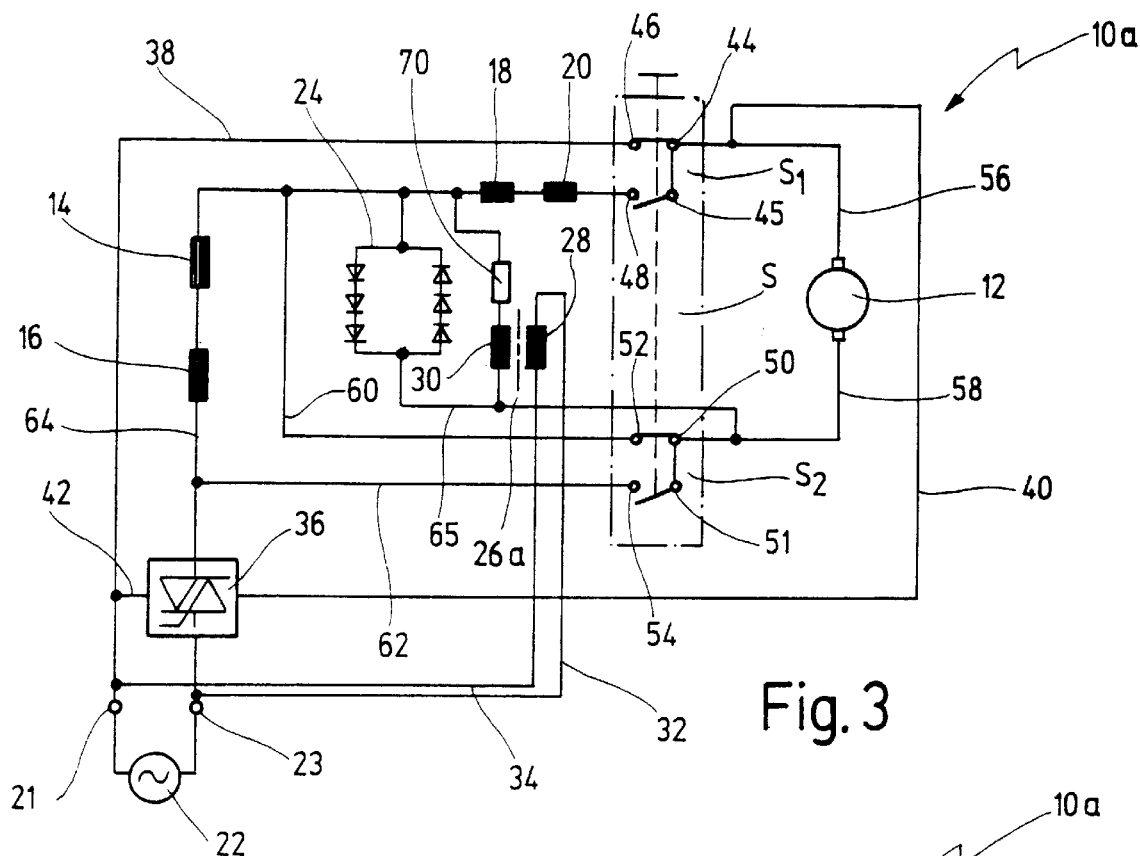
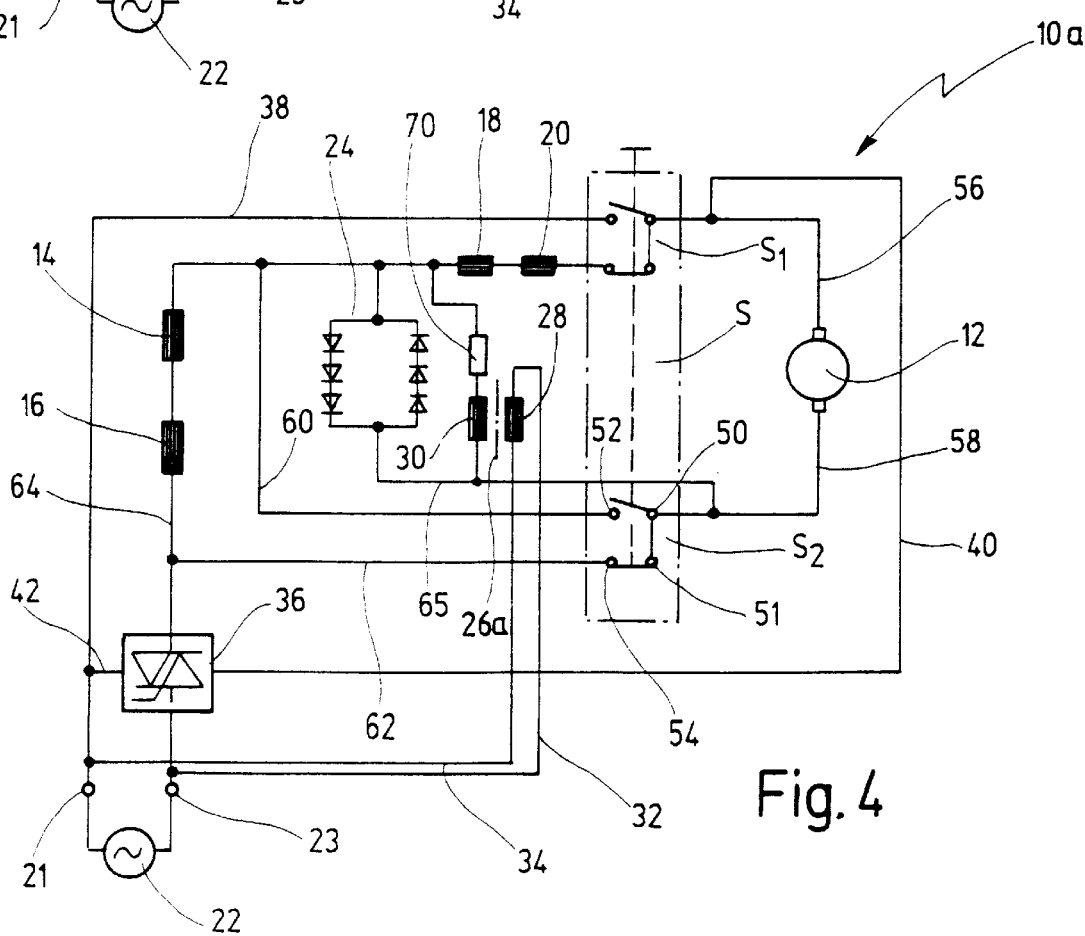
Fig. 3
Fig. 4

SERIES MOTOR

BACKGROUND OF THE INVENTION

The present invention relates to a series motor with commutator, in particular to a universal motor for a braked power tool, having switching means for switching between motor mode and braking mode, where, in motor mode, at least one field winding is connected in series with an armature winding in a motor circuit to which a supply voltage is supplied, and where, in braking mode, the at least one field winding and the armature winding form together a closed braking circuit disconnected from the supply voltage.

A series motor of this kind is known from EP 0 471 038 B1.

The known motor is particularly well suited for driving braked power tools, such as braked right-angle grinders or circular saws, for which purpose it uses a multipole changeover switch by means of which the motor is short-circuited, and the field winding is polarity-reversed, in braking mode, and further means for limiting the braking current by the field winding. This is to permit smooth and rapid short-circuit braking by autonomous self-excitation. The armature is connected in motor mode between the field windings and the commutating windings, while in braking mode a current path is established between the armature and the commutating windings that comprises a Zener diode arrangement for limiting the braking current so that only a certain portion of the braking current is allowed to flow through the field windings.

Although such a motor permits relatively reliable braking of the motor when the latter is switched over to the braking mode, it has been found that in certain individual cases the braking action nevertheless becomes active only with reducing speeds. The reason for this is seen in the fact that in the case of motors that do not commutate perfectly a relatively high transition resistance may exist between collector and brushes, in particular at high speeds and in cases of a slightly out-of-round commutator. In such cases, the remanence is not sufficient for the autonomous self-excitation to produce a braking effect.

One has already tried to circumvent such problems by using a capacitor which is charged, in motor mode, and utilized in braking mode to initiate autonomous self-excitation (DE 36 36 555 A1).

A disadvantage of this arrangement lies, however, in the electronics which are inherently prone to failure, which has the result to reduce the functional safety of the brake. In addition, the capacitor charge can be used only once to initiate the braking action. If the capacitor charge does not suffice to initiate the braking action, than initiation of a braking action can be expected all the less after discharge of the capacitor.

U.S. Pat. No. 2,818,542 describes a shunt-wound d.c. motor intended for stationary use. For amplifying the braking effect in case of activation of the brake, a rectified a.c. voltage, generated via a generator or a transformer, is superimposed in this case on the operating voltage in order to produce an increased magnetic flux for the purpose of achieving rapid braking when the braking action is activated.

A motor of this kind is in no way suited to serve as drive for a braked power tool. Further, such an application requires that a series motor with commutator, preferably a universal motor, be used and that excessively abrupt braking be avoided, as this would result in a considerable risk potential, especially in the case of right-angle grinders.

SUMMARY OF THE INVENTION

It is a first object of the present invention to provide an improved series motor which improves the reliability of the braking action when changing over from motor mode to braking mode.

It is a second object of the invention to provide an improved series motor having less brush sparking.

It is a third object of the invention to provide an improved motor being less prone to failure when braking.

It is a fourth object of the invention to provide an improved series motor with a reliable braking mode which is simple and easy to manufacture.

These and other objects are achieved in a series motor of the type described at the outset by a mains-operated transformer whose secondary winding is connected within the braking circuit.

The secondary winding of the transformer has the effect to introduce an a.c. current into the braking circuit which is sufficient to initiate reliable self-excitation of the motor. The remanence d.c. voltage induced in the armature winding and the a.c. voltage originating from the transformer current are superimposed one on the other.

The invention ensures in this way rapid initiation of the braking action when changing over to braking mode, even under extremely unfavorable conditions in the presence of high transition resistance values between collector and brushes.

According to an advantageous further development of the invention the at least one field winding, in braking mode, forms a closed circuit with at least one commutating winding and with the armature winding.

This feature leads to a further improvement of the braking action of the motor. The commutating winding may be given a relatively small cross-section, as current flows through it only in braking mode, not in motor mode.

According to a further embodiment of the invention the secondary winding of the transformer, in braking mode, is connected in series, in the braking circuit, to the at least one field winding.

In this embodiment, the secondary winding of the transformer is passed by the braking current in the braking mode so that it must be appropriately sized, i.e. in a usual universal motor operated at 230 Volts for a current flow in the order of 5 Amperes. The transformer for such a universal motor is so designed that the secondary voltage is preferably of the order of approximately 2 to 3 Volts, preferably approximately 2.5 Volts.

According to another embodiment of the invention, the secondary winding of the transformer, in braking mode, lies in the braking circuit in a circuit parallel to the field winding.

Preferably, the secondary winding is in this case connected in series to a resistor so as to limit the current flow through the secondary winding of the transformer.

This allows a commercially available transformer to be used since the secondary winding of the transformer is not directly passed by the braking current. When the collector/brush resistance is high, then the secondary current flows through the field winding which has the result to increase the induced voltage in the armature. The higher induced voltage in the armature has the effect to safely initiate the braking action. As the deceleration of the motor progresses, the transition resistance between collector and brushes clearly drops so that at a later point in time the main current flow occurs through the armature winding, whereas the current flow through the secondary side of the transformer can be limited by the resistance.

All in all, the secondary winding of the transformer can be designed in such a way that the effective secondary voltage is in the range of approximately 3 Volts, for example, in which case a series resistor of 20 Ohms is used to achieve an effective current flow of approximately 150 mA. A commercially available transformer of small size will be sufficient for this purpose.

According to an advantageous further development of the invention, limiting means are provided in the braking circuit for limiting the voltage induced at the armature winding.

This feature has the effect to reduce brush sparking.

The limiting means can be designed to limit the voltage seen by the at least one field winding so that the latter is limited to approximately 5 Volts, for example.

The secondary winding of the transformer may be connected in this case with one of its ends to the at least one field winding and with its other end to the armature winding and one end of the limiting means.

Alternatively, the armature winding and the at least one commutating winding are connected in series in the braking circuit and are connected to the at least one field winding, in parallel to the limiting means and the current path formed through the secondary winding of the transformer.

According to a first embodiment, the limiting means is configured as diode path with reverse-parallel connection of the diodes.

According to a further embodiment of the invention, a diode is connected in series with the at least one field winding in the braking circuit.

In this way, the direction of current in the braking circuit is impressed by the diode during self-excitation, irrespective of the existing remanence.

This provides the advantage that the limiting means may be designed as simple diode path, which results in cost savings.

According to a further embodiment of the invention, a diode is connected in series to the secondary winding of the transformer.

This feature has the result that only one half-wave of the a.c. voltage is used for the transformer, i.e. that the transformer is operated with only half the effective voltage in the secondary circuit, which leads to a reduction of the power loss, compared with the use of a resistor in the secondary circuit. It is thus possible to use a low-cost, commercially available transformer.

According to a further variant of the invention, the limiting means comprises a transistor circuit which produces a current flow parallel to the at least one field winding when a threshold voltage is reached at the at least one field winding.

A circuit if this type can be realized at clearly lesser cost than a correspondingly sized diode path.

A particularly advantageous embodiment is obtained when the limiting means comprises a field effect transistor that switches through when a threshold voltage is reached in order to limit the voltage dropping at the at least one field winding.

If the motor is designed for a rated operating voltage of 230 Volts a.c. and a motor output of approximately 2.500 Watts, it is possible with advantage to make direct use of a particular property of a commercially available MOSFET, namely that it will become conductive only when a threshold voltage of between approximately 4.5 and 5 Volts is reached between drain and source. In this case, the MOSFET is connected in the braking circuit, with gate and drain connected to one end of the at least one field winding and with source connected to the other end of the at least one field winding, there being of course provided in the braking circuit a diode for impressing the direction of current. If the voltage-limiting action procured by the MOSFET is to start already at a lower threshold value (logic level MOSFET) of, for example, below 4.5 to 5 Volts, then a special MOSFET with a lower threshold voltage can be used that becomes conductive at a lower threshold voltage of approximately 2 Volts. This reduces the intensity of the braking action.

It is understood that a voltage divider may of course also be used for driving the MOSFET if the voltage-limiting action is to start only when a higher threshold voltage is reached. In this case, the braking characteristics can be adjusted by appropriately adapting the voltage divider to the desired value.

According to a further variant of the invention, a bipolar transistor is used for the limiting means, which may have its base connected to the voltage divider. Since the threshold value of a bipolar transistor is in the range of approximately 0.7 Volts, it is necessary in this case to use a voltage divider which must be suitably designed to produce the desired braking characteristics. There is also a possibility to drive the bipolar transistor via a Zener diode at its base.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Exemplary embodiments of the invention are shown in the drawings and will be described in more detail hereinafter with reference to the drawings, in which:

FIG. 3 shows a variant of the circuit according to FIG. 1 in motor mode;

FIG. 4 shows a further variant of the circuit according to FIG. 3 in braking mode;

DETAILED DESCRIPTION OF THE PREFERRED EMBODIMENTS

Figure 1:
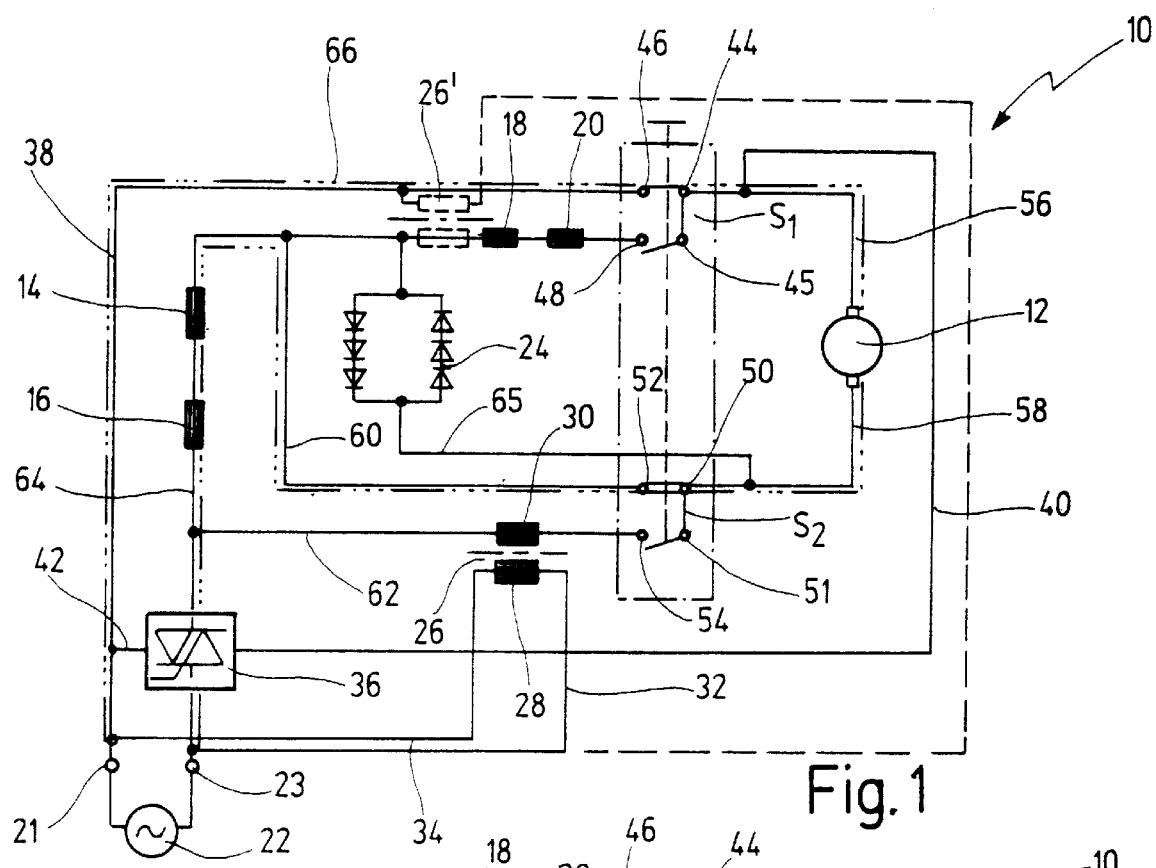
FIG. 1 shows a simplified diagram of the motor according to the invention, in motor mode.
Figure 2:
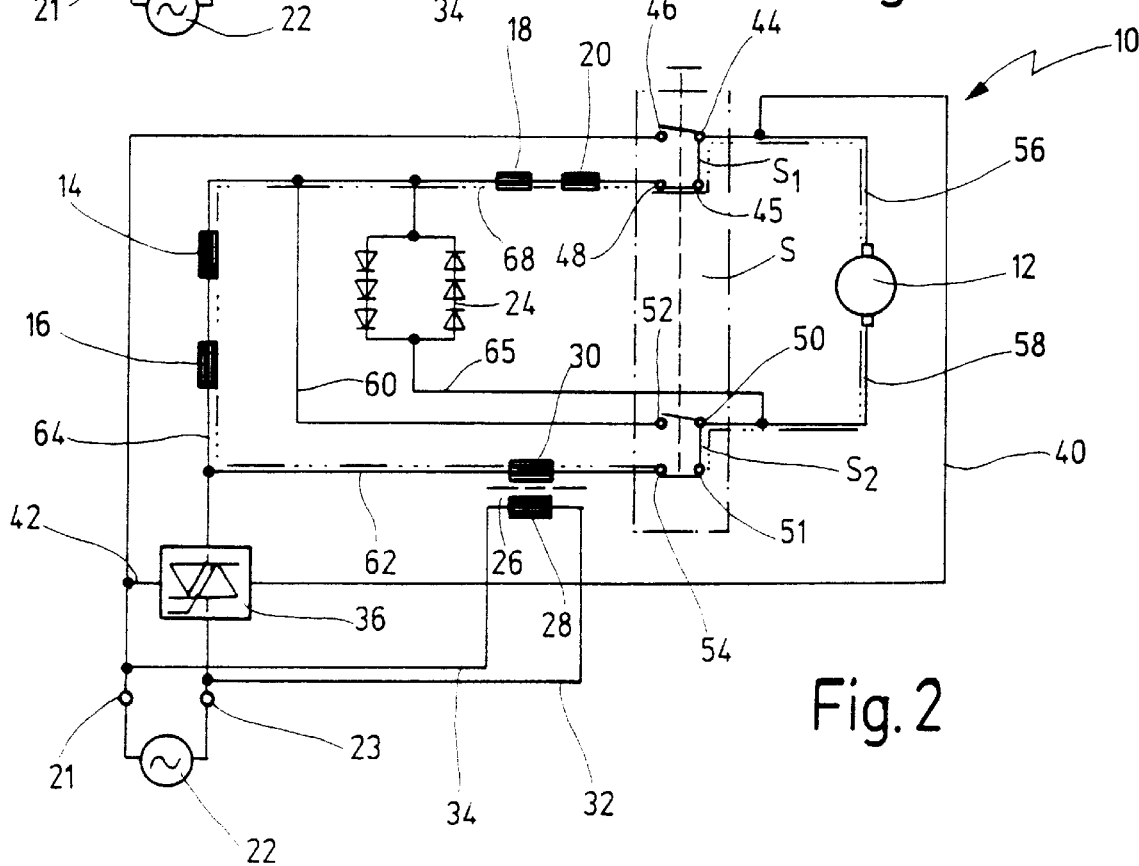
FIG. 2 shows the circuit according to FIG. 1 in braking mode.

In FIGS. 1 and 2 a series motor according to the invention is indicated generally by reference numeral 10.

The motor 10 comprises an armature with an armature winding 12 which, in the motor mode illustrated in FIG. 1, can be connected in series to a supply voltage source 22 supplying an a.c. voltage of 230 Volts via a commutator, not shown, and brushes indicated only schematically, via a switch $S_1$, $S_2$.

The switch $S_1$, $S_2$ is a bipolar changeover switch, consisting of a first changeover switch $S_1$ and a second changeover switch $S_2$. The first pole 21 of the supply voltage source 22 is connected, via a line 38, to a first changeover contact 46 of the first changeover switch $S_1$, which in the motor mode illustrated in FIG. 1 is connected to interconnected switching contacts 44 and 45 of the changeover switch $S_1$, which are in their turn coupled with one pole of the commutating winding 12, via a line 56. The second pole of the armature winding 12 is connected, via a line 58, to two interconnected contacts 50 and 51 of the second changeover switch $S_2$, which in their turn are connected, in the illustrated switching condition, to a contact 52 coupled via line 60 with a first end of a first field winding 14, which latter is connected in series to the second field winding and, via control electronics 36, to the second pole 23 of the supply voltage source 22. The control electronics 36 are additionally coupled, via a control line 42, to the other pole 21 of the supply voltage source 22 and, via a control line 40, to the contacts 44 and 45 of the first changeover switch $S_1$.

The control electronics 36 serves for limiting the start-up current during the starting phase of the motor so as to limit the no-load speed of the motor, and prevents the motor from starting when a plug connecting it to the supply voltage source 22 is plugged in while the switch S occupies its on position illustrated in FIG. 1. The control electronics 36, known per se, is connected to the field winding 16 whereas the second field winding 14 is connected via the switch $S_1$ to the armature winding 12, the latter in its turn being coupled to the other pole of the supply voltage source 22. This arrangement facilities interference suppression of the series motor 10.

The motor circuit 66, containing the armature winding 12, the two field windings 14, 16 and the control electronics 36, which is closed in this way in motor mode, is indicated in FIG. 1 by a dash-dotted line with three dots.

The second changeover contact 48 of the first changeover switch $S_1$ is connected, via two series-connected commutating windings 18, 20, to the connection of the first field winding 14 which is likewise connected to the armature winding 60 via contacts 54, 51.

Between the one end of the field winding 14 and the commutating winding 18, there is connected one end of a voltage-limiting means 24, consisting of two diode paths, provided in inverse-parallel connection one relative to the other, while its other end is connected via a line 65 to the contacts 50 and 51, respectively, of the switch $S_2$, or to the line 58 connected to the armature winding 12, respectively.

Now, when the switching means S is switched over from the position illustrated in FIG. 1 (motor mode) to the position illustrated in FIG. 2 (braking mode), i.e. when the contact 45 of the first changeover switch $S_1$ is connected to the contact 48, while the connection between contact 44 and contact 46 is opened, and the contact 51 of the second changeover switch $S_2$ is connected to the contact 54, while the connection between contact 50 and contact 52 is opened, then the circuit illustrated in FIG. 2 is obtained, where the braking circuit 68, now in its closed condition, is indicated again in dash-dotted lines.

The first pole of the supply voltage source 22 is in this case disconnected from the braking circuit 68 by the open connection between the contacts 44, 46 of the first changeover switch $S_1$.

A transformer indicated generally by reference numeral 26 is permanently connected with its primary side 28 to the two poles 21, 23 of the supply voltage source 22. The transformer 26 has its secondary winding 30 connected, via a line 62, to the line 64, which latter is connected on the one hand to the one field winding 16 and on the other hand to the control electronics 36 through which the field winding is connected to the supply voltage pole 23. The other end of the secondary winding 30 of the transformer 26 is connected to the contact 54 of the second changeover switch $S_2$ which is open in the motor mode illustrated in FIG. 1 and is connected to the contacts 50, 51 in the braking mode according to FIG. 2, while the connection between the contacts 50, 52 is separated in braking mode.

The secondary winding 30 of the transformer 26 is, thus, connected with its one end to the field winding 16 and with its other end to the armature winding 12.

In this way, one obtains, in the braking mode according to FIG. 2, a closed braking circuit 68, in which the two field windings 14, 16, the secondary winding 30 of the transformer 26, the armature winding 12 and the two commutating windings 18, 20 are connected in series.

Further, the voltage limiting circuit 24 is connected, as mentioned before, between the field winding 14 and the commutating winding 18 on the one side and between the secondary winding 30 and the armature winding 12 on the other side.

The voltage limiting circuit 24 is designed in such a way that the two diode paths, provided in inverse-parallel connection, become conductive at approximately 5 Volts so that the sum of the voltage induced in the armature winding 12 and the voltage dropping at the two commutating windings 18, 20 is limited to a maximum of 5 Volts.

Now, the transformer 26 is designed in such a way that when the primary winding sees an input voltage of 230 Volts, the secondary winding 30 sees an effective output voltage of approximately 2.5 Volts. The internal resistance of the secondary winding 30 is kept very low, in the illustrated example at approximately 0.2 Ohms. Summed up with the higher resistance of the field windings 14, 16 (approximately 1 Ohm d.c. resistance, approximately 20 Ohms d.c. impedance at 50 Hz) and the impedances of the commutating windings 18, 20 and the armature winding 12, the resulting current flow amounts to approximately 150 mA, at a secondary voltage of 2.5 Volts.

A current flow in this order guarantees safe excitation of the motor in the braking mode.

After initiation of the braking action the d.c. voltage induced at the field windings 14, 16 rises and will be limited to a maximum of 5 Volts by the voltage limiting means 24, whereby a maximum braking current of approximately 5 Amperes will be obtained.

On the other hand, the transformer 26 has only little power loss in the motor mode with the secondary winding 30 in open condition.

The secondary winding 30 of the transformer 26 must, however, be designed for the full maximum rated current of approximately 5 Amperes.

It is understood that, contrary to the representations of FIGS. 1 and 2, the transformer may be inserted into the braking circuit also at a different point.

FIG. 1 shows, by way of example, in dotted lines, the transformer 26' the secondary winding of which may be connected, for example, between the one field winding 14 and the one commutating winding 18.

FIGS. 3 and 4 show a variant of the embodiment of the series motor according to the invention, as illustrated in FIGS. 1 and 2, indicated generally be reference numeral 10a.

Corresponding parts are designated in these drawings by like reference numerals.

A difference to the embodiment illustrated in FIGS. 1 and 2 lies in the fact that the secondary winding 30 of the transformer 26a, instead of being connected in series in the braking circuit, is connected in parallel to the voltage limiting means 24 between the armature winding 12 and the one field winding 16 on the one hand and, on the other hand, via a resistor 70, between the field winding 14 and the one commutating winding 18.

Compared with the embodiment described above with reference to FIGS. 1 and 2, this provides the advantage that the secondary winding 30 of the transformer 26a is not exposed to the full maximum braking current. The primary side 28 of the transformer 26 is again permanently connected to the two poles 21, 23 of the supply voltage source 22.

The transformer is designed, for example, in such a way that it supplies an effective secondary voltage of approximately 3 Volts at an effective primary voltage of 230 Volts. The resistor 70 can then be selected appropriately so that a current through the secondary winding 30 of approximately 170 mA is obtained. A commercially available resistor of 20 Ohms may be selected for this purpose. The resistor 70 may be replaced by a diode that serves to limit the current.

One obtains with this arrangement reliable initiation of self-excitation for the braking action. Now, when the voltage at the field windings 14, 16 rises during the braking action to a maximum of approximately 5 Volts, the current flow through the secondary winding 30 of the transformer 26a will rise only slightly, due to the resistor 70. Consequently, a commercially available miniature transformer may be used which leads to a simplification and to cost savings compared with the embodiment described before with reference to FIGS. 1 and 2.

Compared with the embodiment illustrated in FIGS. 1 and 2, where the secondary winding of the transformer is connected in series to the field windings 14, 16, an additional advantage is achieved insofar as in case of a high transition resistance between commutator and brushes the current flow occurs essentially through the field windings 14, 16, in the braking mode, so that the voltage induced in the armature 12 rises considerably. Self-excitation is thereby safely initiated, regardless of the transition resistance between collector and brushes.

Two further variants of the series motor according to the invention, in which the diode path used for limiting the voltage is replaced by a transistor circuit, will be described below with reference to FIGS. 5 and 6.

Here again, the same reference numerals are used for designating corresponding parts.

Figure 5:
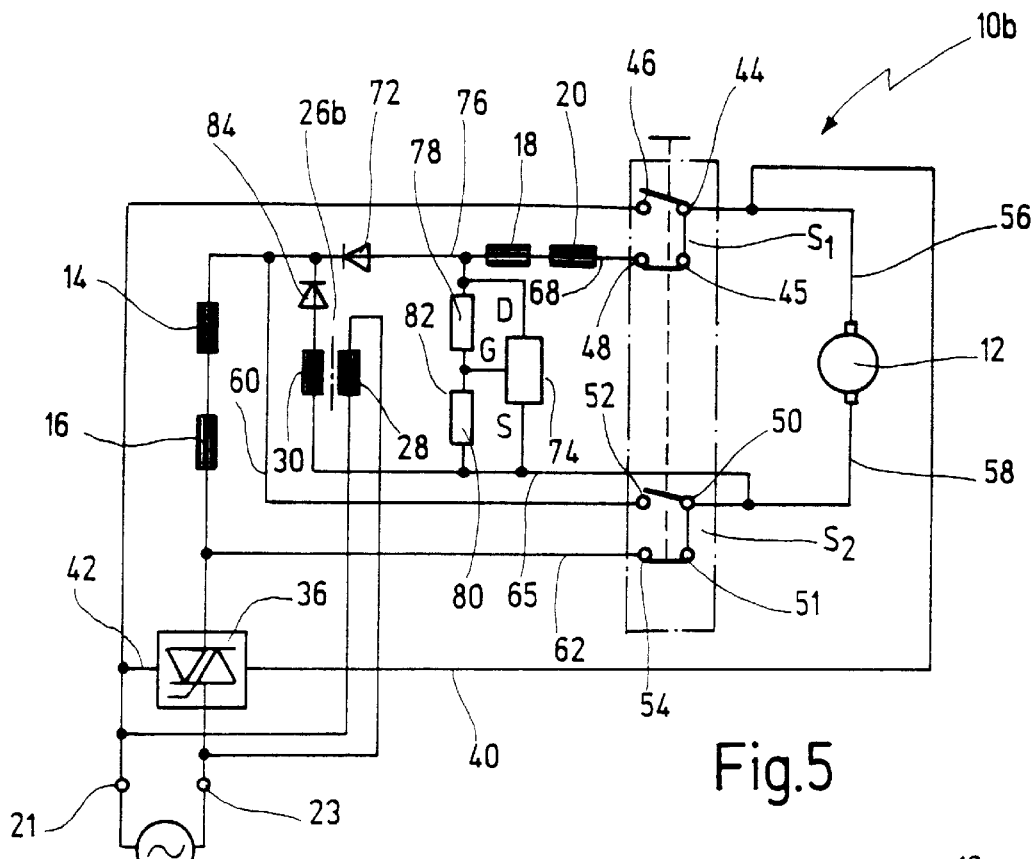
FIG. 5 shows a variant of the circuit according to FIG. 2 in braking mode.

FIG. 5 shows a series motor, in braking mode, indicated generally by reference numeral 10b, which differs from the embodiment described above with reference to FIG. 4 essentially insofar as the limiting means has been replaced by a MOSFET 74.

The series resistor in the secondary circuit of the transformer 26b has been replaced in this case by a diode 84. It would of course be possible also to connect the secondary winding 30 of the transformer 26b on one end to the field winding 14 and on the other end to the line 65, which latter is connected to the contact 50 of the switch $S_2$ and, thus, via line 58 to the armature winding 12, provided the secondary winding is designed correspondingly.

However, a diode 72, which has its anode connected to the first commutating winding 18 via a line 76, is connected with its cathode to the field winding 14, the latter being connected to the diode 84. The MOSFET 74 is connected to line 76 with its drain D and to line 65 with its source S. The gate G of the MOSFET 74 is connected, via a voltage divider 82, to the resistors 78 (1 KOhm) and 80 (6 KOhms) between the lines 76 and 65.

For the rest, the structure of the circuit is absolutely identical to the circuit described above with reference to FIG. 4.

The direction of current in the braking circuit is determined by the diode 72. Self-excitation is initiated by the transformer 26b, so that safe braking is guaranteed.

If in the course of the braking action the induced voltage rises to an extent that the threshold voltage of the MOSFET, being approximately 4.5 to 5 Volts, is reached, then the MOSFET becomes conductive and limits any further rise of the induced braking voltage so that any excessively abrupt braking action is prevented.

It has been found that in the case of the previously described design of a motor for a rated operating voltage of 230 Volts a.c., at an output of 2.500 Watts, the MOSFET 74 and, under certain circumstances, gate D and drain D as well, may be connected to line 76 jointly, whereby an extremely simple and reliable circuit with only a small number of components would be achieved. The voltage divider (1 k$\Omega$/6 k$\Omega$) permits, however, to adjust the braking action to the desired value.

Figure 6:
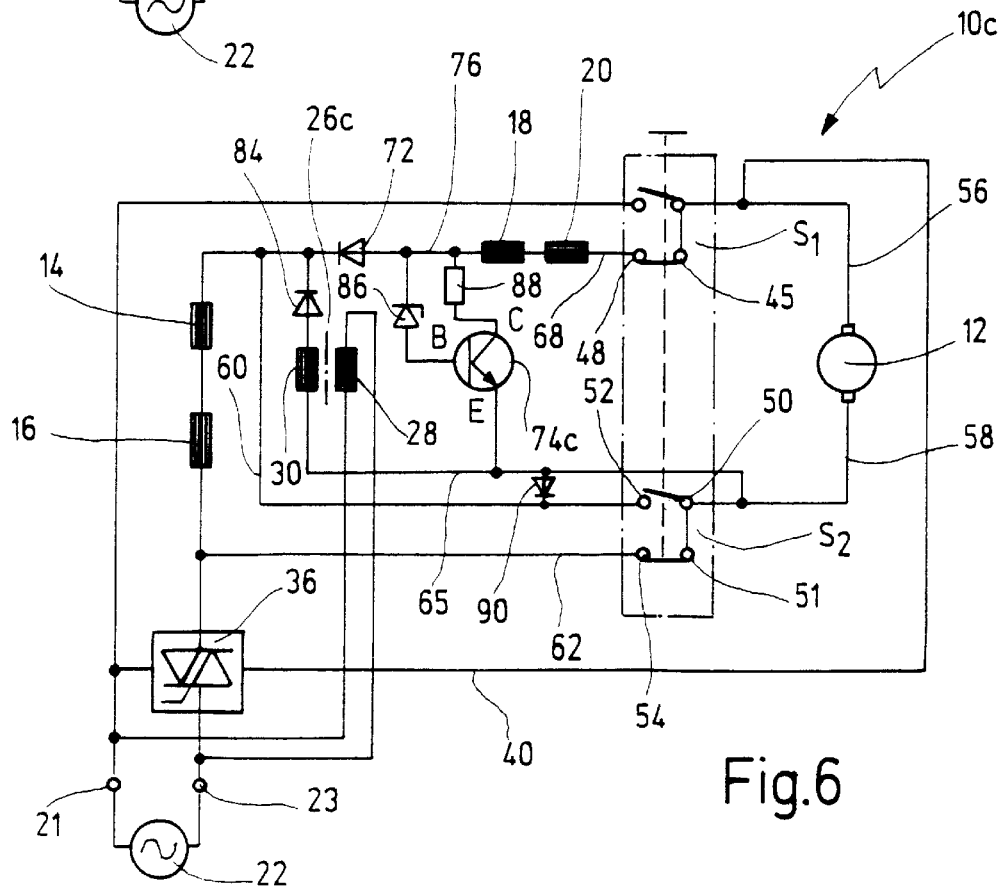
FIG. 6 shows a further variant of the circuit according to FIG. 2 in braking mode.

Another variant of a series motor according to the invention, using a bipolar transistor 74c for limiting the braking voltage, is illustrated in FIG. 6 and indicated generally by reference numeral 10c.

Here again, the diode 84 is series-connected to the secondary winding 30 and has its cathode connected to the field winding 14 and the cathode of the other diode 72, which in its turn is series-connected to the commutating windings 18, 20.

Instead of the MOSFET 74 according to FIG. 5, this arrangement now uses a bipolar transistor 74c, which has its collector C connected, via a resistor 78 (0.22 Ohms) to the line 76 which connects the diode 72 to the commutating winding 18, and has its emitter E connected to the line 65, which connects the other end of the secondary winding 30 to the contact 50 of the switch $S_2$. The base B of the transistor 74c is connected to line 76 via a Zener diode 86 of 3.6 Volts. Further, a diode 90 may be additionally connected between the contacts 50 and 52 to counteract any arcing effects that may be encountered in case of unfavorable switching performance of the switch $S_2$ when switching over from motor mode to braking mode. Generally, however, such a diode 90 can be dispensed with.

The resistor 98 in the collector circuit, which is preferably rated at 0.22 Ohms, is likewise not absolutely necessary, although it helps achieve improved heat dissipation from the transistor, being arranged on the circuit spatially separate from the transistor. The rating should be selected to ensure that the voltage drop is smaller than the predetermined threshold value at which the transistor 74c is to become conductive. In the case of the rating described before, the voltage drop at the resistor 78 must, therefore, be smaller than 5 Volts.

Generally, such a resistor may of course also be used in connection with the MOSFET 74.

What is claimed is:
1. A series motor comprising:
at least one field winding;
an armature having an armature winding and a commutator;
a transformer having a primary and a secondary winding, said primary winding being connected to an a.c. power source;

a switching means for switching between a motor mode and a braking mode, wherein said at least one field winding, when in said motor mode, is connected in series with said armature winding, thereby forming a motor circuit hard-wired and electrically connected to said a.c. power source; and wherein said at least one field winding, said secondary winding of said transformer and said armature winding form together a closed braking circuit electrically disconnected from and without hard-wired connection to said a.c. power source, when in said breaking mode.

2. The series motor of claim 1, further comprising at least one commutating winding, wherein said at least one field winding, when in said braking mode, is connected in series with said at least one field winding and said armature winding.

3. The series motor of claim 1, wherein said secondary winding of said transformer, when in said braking mode, is connected in series with said at least one field winding and said armature winding within said braking circuit.

4. The series motor of claim 2, wherein said secondary winding of said transformer, when in said braking mode, is connected in series with said at least one field winding, said armature winding and said commutating winding within said braking circuit.

5. The series motor of claim 1, wherein said secondary winding of said transformer, when in said braking mode, is connected in parallel to said at least one field winding.

6. The series motor of claim 2, wherein said secondary winding of said transformer, when in said braking mode, is connected in parallel to the field winding.

7. The series motor of claim 4, wherein said secondary winding of said transformer is connected in series to a resistor.

8. The series motor of claim 1, further comprising limiting means provided within the braking circuit for limiting the voltage induced at said armature winding.

9. The series motor of claim 8, wherein said secondary winding comprises a first end and a second end, said first end being connected to said at least one field winding, said second end being connected to said armature winding and one end of said limiting means, when in said braking mode.

10. The series motor of claim 5, further comprising limiting means provided within the braking circuit for limiting the voltage induced at said armature winding, wherein said armature winding and said at least one commutating winding are connected in series, when in said braking mode, and in parallel to said limiting means, said at least one field winding, and to said secondary winding of said transformer.

11. The series motor of claim 8, wherein the limiting means is configured as a diode path, comprising a first plurality of diodes connected in series and a second plurality of diodes connected in series, but with reversed polarity with respect to said first plurality of diodes.

12. The series motor of claim 10, wherein the limiting means is configured as a diode path, comprising a first plurality of diodes connected in series and a second plurality of diodes connected in series, but with reversed polarity with respect to said first plurality of diodes.

13. The series motor of claim 8, further comprising a diode connected in series to said at least one field winding within said braking circuit.

14. The series motor of claim 13, wherein the limiting means is designed as simple diode path, comprising a plurality of diodes connected in series.

15. The series motor of claim 5, further comprising a diode connected in series to said secondary winding of said transformer.

16. The series motor of claim 15, further comprising limiting means provided within the braking circuit for limiting the voltage induced at the armature winding, wherein said armature winding and said at least one commutating winding connected in series with said armature winding, when in said braking mode, are connected in parallel to said limiting means, said secondary winding and said at least one field winding, wherein said limiting means comprise a transistor circuit effecting a current flow in parallel to said at least one field winding upon reaching a threshold voltage across said at least one field winding.

17. The series motor of claim 16, wherein said transisitor curcuit comprises a field effect transistor that switches through when said threshold voltage is reached in order to limit the voltage dropping at said at least one field winding.

18. The series motor of claim 17, further comprising a voltage divider, having a first end, a second end and an intermeadiate connection, and wherein said field effect transistor comprises a drain, a gate and a source, said drain and said first end of said voltage divider being connected to one end of said at least one commutating winding and to one end of said at least one field winding via a diode, said gate being connected to said intermediate connection of said voltage divider, said other end of said voltage divider and said source being connected to another end of said at least one field winding.

19. The series motor of claim 16, wherein said limiting means comprises a bipolar transistor.

20. The series motor of claim 19, wherein said bipolar transistor comprises a base, a collector and an emitter, wherein said collector is connected to one end of said at least one commutating winding and via a diode to one end of said at least one field winding, wherein said emitter is connected to another end of said field winding, when in said braking mode, and wherein said base is connected between said diode and said at least one commutating winding via a bias voltage means.

21. The series motor of claim 20, wherein said bias voltage means is configured a Zener diode.

* * * * *